United States Patent
Sato

(10) Patent No.: US 7,742,183 B2
(45) Date of Patent: Jun. 22, 2010

(54) METHOD AND APPARATUS FOR FORMAT CONVERSION OF PRINTING DATA

(75) Inventor: Eiichi Sato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1014 days.

(21) Appl. No.: 10/118,939

(22) Filed: Apr. 10, 2002

(65) Prior Publication Data

US 2002/0154328 A1    Oct. 24, 2002

(30) Foreign Application Priority Data

Apr. 18, 2001    (JP)  .............................. 2001-119970

(51) Int. Cl.
G06F 3/12    (2006.01)
G06F 3/00    (2006.01)

(52) U.S. Cl. ........................ 358/1.15; 358/1.13; 710/15

(58) Field of Classification Search ................. 709/224, 709/228, 223, 202; 358/1.15; 710/15
See application file for complete search history.

(56) References Cited

U.S. PATENT DOCUMENTS

| | | | |
|---|---|---|---|
| 5,220,674 A * | 6/1993 | Morgan et al. ............... | 709/223 |
| 5,323,393 A | 6/1994 | Barrett et al. ............... | 370/85.8 |
| 5,740,368 A | 4/1998 | Villalpando ............ | 395/200.32 |
| 5,933,580 A | 8/1999 | Uda et al. .................... | 395/112 |
| 6,088,120 A * | 7/2000 | Shibusawa et al. .......... | 358/1.15 |
| 6,314,476 B1 * | 11/2001 | Ohara .......................... | 710/15 |
| 6,348,973 B1 * | 2/2002 | Vatland et al. .............. | 358/1.15 |
| 6,369,909 B1 | 4/2002 | Toshihiro | |
| 6,477,567 B1 | 11/2002 | Ohara | |
| 6,559,965 B1 * | 5/2003 | Simpson et al. ............ | 358/1.15 |
| 6,618,360 B1 * | 9/2003 | Scoville et al. .............. | 370/248 |
| 6,678,068 B1 * | 1/2004 | Richter et al. .............. | 358/1.15 |
| 6,814,510 B1 * | 11/2004 | Sabbagh et al. ............... | 400/63 |
| 6,862,103 B1 * | 3/2005 | Miura et al. ................ | 358/1.15 |
| 6,940,615 B1 | 9/2005 | Toshihiro | |
| 7,173,723 B1 * | 2/2007 | Ando ......................... | 358/1.15 |

(Continued)

FOREIGN PATENT DOCUMENTS

JP    5-292240    11/1993

(Continued)

OTHER PUBLICATIONS

Internetworking Technologies Handbook, Dec. 2000, Cisco Press, 3rd Edition, 56-1 to 56-12, http://www.cisco.com/univercd/cc/td/doc/cisintwk/ito_doc/snmp.pdf.*

(Continued)

*Primary Examiner*—Benny Q Tieu
*Assistant Examiner*—Vincent Rudolph
(74) *Attorney, Agent, or Firm*—Fitzpatrick, Cella, Harper & Scinto

(57) ABSTRACT

Disclosed herein is a printing control apparatus for enabling an image forming apparatus, having a network connection function and printing data interpretation function, to print printing data written in a format that cannot be interpreted by the interpretation function of the image forming apparatus. The printing control apparatus, connected between a network and an image forming apparatus having a network interface, determines whether or not a data packet received from the network is printing data (S303), and when the received data packet is printing data, encodes the received data packet in a format interpretable by the image forming apparatus (S305) to be outputted to the image forming apparatus.

18 Claims, 12 Drawing Sheets

U.S. PATENT DOCUMENTS

| | | | |
|---|---|---|---|
| 2001/0004745 A1* | 6/2001 | Villalpando | 709/223 |
| 2002/0093676 A1* | 7/2002 | Parry | 358/1.15 |
| 2002/0131066 A1* | 9/2002 | Young | 358/1.13 |
| 2002/0196455 A1* | 12/2002 | Ishizuka et al. | 358/1.9 |

FOREIGN PATENT DOCUMENTS

| | | | |
|---|---|---|---|
| JP | 9138740 A | 5/1997 |
| JP | 11053139 A | 2/1999 |
| JP | 11184649 A | 7/1999 |
| JP | 2000293324 A | 10/2000 |

OTHER PUBLICATIONS

SNMP: birth and evolution, http://www.et.put.poznan.pl/snmp/intro/ihistor2.html.*

Japanese Office Action dated Feb. 5, 2010 concerning the Japanese Patent Application No. 2001-119970.

* cited by examiner

METHOD AND APPARATUS FOR FORMAT CONVERSION OF PRINTING DATA

FIELD OF THE INVENTION

The present invention relates to a printing control apparatus provided between a LAN and an image forming apparatus or a multi-function apparatus having an image forming function, which is capable of being connected to a network such as a LAN, and to a control method of the printing control apparatus.

BACKGROUND OF THE INVENTION

Conventionally, in a case where an apparatus having an image forming function (hereinafter referred to as an image forming apparatus), e.g., a copying machine, printer, facsimile, multi-function apparatus and so on, is connected to a computer network (hereinafter simply referred to as a network) such as a local area network (LAN), an image forming apparatus having network connection means, e.g., a network interface or the like, and an image forming apparatus not having network connection means employ different connection methods.

FIG. 10 is a view of a LAN structure, shown as an example of a network, connecting an image forming apparatus including a network interface and an image forming apparatus not including (or incapable of including) a network interface.

Referring to FIG. 10, reference numeral 5001 denotes a LAN; 5002, an image forming apparatus not having a network interface; 5003, a printer server which enables the image forming apparatus 5002 to connect to the LAN 5001 to serve as a network printer; 5004, a conventional interface used for local connection, typically exemplified by IEEE 1284 (so-called parallel interface); 5005, a communication cable serving as a communication medium of the interface 5004; 5006, a network interface for connecting to the LAN 5001; 5007, an image forming apparatus having a network interface directly connectable to the LAN 5001; 5008, a network interface connecting the image forming apparatus 5007 to the LAN 5001; and 5009, a terminal apparatus connected to the LAN.

Although not shown in the drawing, generally plural terminal apparatuses 5009 are connected to the LAN 5001 as a printing client or a controller of other apparatuses.

The image forming apparatus 5002, which does not have means to connect to the LAN 5001, generally employs the printer server 5003 to communicate with the terminal apparatus 5009 which is connected to the LAN 5001. More specifically, the printer server 5003, having the interface 5004 that is also included in the image forming apparatus 5002, is connected to the image forming apparatus 5002 through the communication cable 5005. Meanwhile, the printer server 5003 is connected to the LAN 5001 through the network interface 5006. By virtue of the above construction, the image forming apparatus 5002 can perform data communication with the terminal apparatus 5009.

When the terminal apparatus 5009 transmits data (packet data) to the printer server 5003, the data is propagated to the LAN 5001 and captured by the printer server 5003 through the network interface 5006. The processing performed by the printer server 5003 is now described with reference to the flowchart in FIG. 11.

When the printer server 5003 receives the data packet (step S5101), the printer server 5003 determines whether the received data is printing data or control data by analyzing, for instance, the packet header portion (step S5102). When the received data is determined as printing data, portions that are not related to printing processing, e.g., the header or footer added for communication through the LAN, are removed from the data, thereby extracting printing data (step S5103). The printing data, extracted in the foregoing manner, is again formed into a packet having a structure suitable to the conventional interface 5004 of the image forming apparatus 5002 (step S5104), and transmitted to the image forming apparatus 5002 (step S5105). The data packet is transmitted to the image forming apparatus 5002 through the communication cable 5005 and interface 5004. The image forming apparatus 5002 processes the data packet and performs image formation on a printing medium based on contents of the data packet. Accordingly, printing processing instructed by the terminal apparatus 5009 is completed.

Meanwhile, if it is determined at the determination step (step S5102) that the received data is control data, the printer server 5003 interprets the control data (step S5106). The control data is converted to a command system that can be interpreted by the image forming apparatus 5002 (step S5107), and transmitted to the image forming apparatus 5002 (step S5105). The image forming apparatus executes processing in accordance with the received command (e.g., performs on-line or off-line control).

Depending on the printer server, there is a type which extracts printing data (step S5103), interprets a page description language (PDL) included in the printing data and converts it to a language that can be interpreted by the image forming apparatus 5002, then forms the converted data into a packet (step S5104), and transmits the packet to the image forming apparatus 5002 (step S5105).

Next, processing performed by the image forming apparatus 5007, which includes a network interface as means to directly connected to the LAN 5001, is explained with reference to the flowchart in FIG. 12.

The data packet from the terminal apparatus 5009 is transmitted directly to the image forming apparatus 5007. The data packet is propagated to the LAN 5001, and captured by the image forming apparatus 5007 through the network interface 5008.

When the image forming apparatus 5007 receives the data packet (step S5201), the image forming apparatus 5007 determines whether the received data is printing data or control data by analyzing, for instance, the packet header portion (step S5202). When the received data is determined as printing data, portions that are not related to printing processing, e.g., the header or footer added for communication through the LAN 5001, are removed from the data, thereby extracting printing data (step S5203). The printing data, extracted in the foregoing manner, is subjected to raster image processing (RIP) (step S5204). RIP, also called rasterizing processing, is processing for converting a received page description language (PDL) to raster image data. The raster image data, obtained by the conversion processing, is subjected to printing processing (step S5205) for image formation on a printing medium. Accordingly, printing processing instructed by the terminal apparatus 5009 is completed.

Meanwhile, if it is determined at the determination step (step S5202) that the received data is control data, the image forming apparatus 5007 interprets the command (step S5206) and executes processing in accordance with the command (step S5207) (e.g., performs on-line or off-line control).

Depending on the type of image forming apparatus 5007 having a network interface, there is a type incapable of interpreting a printing language such as a PDL. An image forming apparatus of this type does not operate solely as a printer, but has a capability to perform image formation in cooperation with other apparatuses connected to the LAN 5001. For instance, the image forming apparatus receives scanner-read image data directly from a network scanner connected to the LAN 5001, or receives image data encoded in a compression form such as JBIG, then performs RIP on the received data (decoded data if necessary), and executes printing. Such printing processing is executable only with respect to a printing request, which is transmitted from an apparatus capable of directly outputting data in a data format that is printable by the image forming apparatus 5007 specified in advance.

As described above, in order to perform printing, the image forming apparatus 5007, having means for directly connecting to the LAN 5001 and means for interpreting a printing language, interprets the printing data (printing language formed into a data packet), transmitted from a client, with the use of the interpretation means. In other words, the image forming apparatus is incapable of printing the printing data written in a printing language or data format that cannot be interpreted by the interpretation means.

On the contrary, the image forming apparatus 5002, not having means for directly connecting to the LAN 5001, can perform printing processing of various printing data written in various printing languages or data formats, by exchangeably utilizing the printer server 5003 for interpreting different printing languages.

However, in a case where the printer server 5003 is provided, the terminal apparatus 5009 cannot directly acquire from the image forming apparatus 5002 information related to the state and features of the image forming apparatus 5002. Furthermore, the image forming apparatus 5002 cannot voluntarily transmit information related to the state and features to the terminal apparatus 5009.

SUMMARY OF THE INVENTION

The present invention has been proposed in view of the problems of the above-described conventional art, and has as its object to provide a printing control apparatus and control method thereof, which enable an image forming apparatus, having a network connection function and printing data interpretation function, to print printing data having a format that cannot be interpreted by the interpretation function of the image forming apparatus, and enable a network-connected apparatus to acquire information regarding the image forming apparatus.

According to the present invention, a printing control apparatus connected to a network through a first network interface and connected to an image forming apparatus through a second network interface, comprising: first determination means, arranged to determine whether received data received through the first network interface is printing data or request data; second determination means, employed in a case where the received data is printing data, to determine whether or not to convert a format of the printing data; data format conversion means, employed in a case of converting the format of the printing data, to convert the format of the printing data to a different format; first output means, arranged to output the printing data, or printing data whose data format has been converted, through the second network interface; third determination means, employed in a case where the received data is request data, to determine whether the request data is related to the printing control apparatus or image forming apparatus by analyzing the request data; and second output means, employed in a case where the request data is related to the image forming apparatus, to output the request data through the second network interface.

In addition, according to the present invention, a control method of a printing control apparatus having first and second network interfaces, comprising: a first determination step of determining whether or not received data, received through the first network interface, is printing data; a second determination step of determining whether or not a format of printing data is a predetermined format in a case where the received data is printing data; a data format conversion step of converting the format of the printing data to the predetermined format in a case where the second determination step determines that the format of the printing data is not the predetermined format; and an output step of outputting the printing data, or printing data whose data format has been converted, through the second network interface.

Further, according to the present invention, a computer program product for a printing control apparatus connecting a computer apparatus to a network through a first network interface and to an image forming apparatus through a second network interface, the computer program product causing the printing control apparatus to function as a printing control apparatus comprising: first determination means, arranged to determine whether received data received through the first network interface is printing data or request data; second determination means, employed in a case where the received data is printing data, to determine whether or not to convert a format of the printing data; data format conversion means, employed in a case of converting the format of the printing data, to convert the format of the printing data to a different format; first output means, arranged to output the printing data, or printing data whose data format has been converted, through the second network interface; third determination means, employed in a case where the received data is request data, to determine whether the request data is related to the printing control apparatus or image forming apparatus by analyzing the request data; and second output means, employed in a case where the request data is related to the image forming apparatus, to output the request data through the second network interface.

Moreover, according to the present invention, a printing control apparatus connected to a network through a first network interface and connected to an image forming apparatus through a second network interface, comprising: determination means, employed in a case where received data is printing data, to determine whether or not to convert a format of the printing data; data format conversion means, employed in a case of converting the format of the printing data, to convert the format of the printing data to a different format; output means, arranged to output the printing data, or printing data whose data format has been converted, through the second network interface; input means, arranged to input notification data related to the image forming apparatus, which is transmitted without being requested by an external apparatus, through the second network interface; and transmission means, arranged to transmit the notification data, inputted by the input means, through the first network interface.

According to the present invention, a computer program product for a printing control apparatus connecting a computer apparatus to a network through a first network interface and to an image forming apparatus through a second network interface, the computer program product causing the printing control apparatus to function as a printing control apparatus comprising: determination means, employed in a case where received data is printing data, to determine whether or not to convert a format of the printing data; data format conversion means, employed in a case of converting the format of the printing data, to convert the format of the printing data to a different format; output means, arranged to output the printing data, or printing data whose data format has been converted, through the second network interface; input means, arranged to input notification data related to the image forming apparatus, which is transmitted without being requested by an external apparatus, through the second network interface; and transmission means, arranged to transmit the notification data, inputted by the input means, through the first network interface.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

—Connection Form of Printing Control Apparatus

Figure 2:
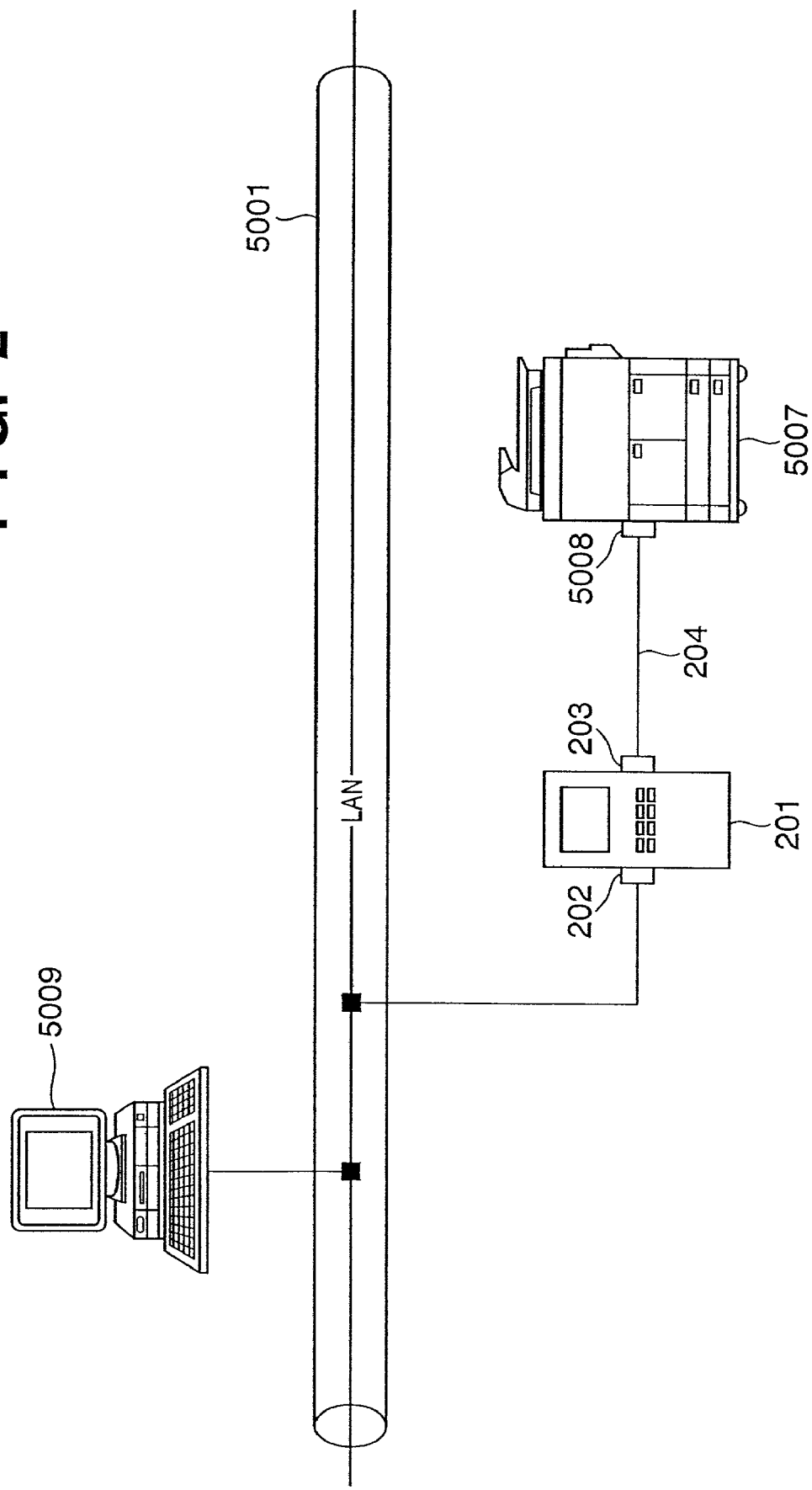
FIG. 2 is a view showing a connection form of the printing control apparatus according to the embodiment of the present invention.
Figure 3:
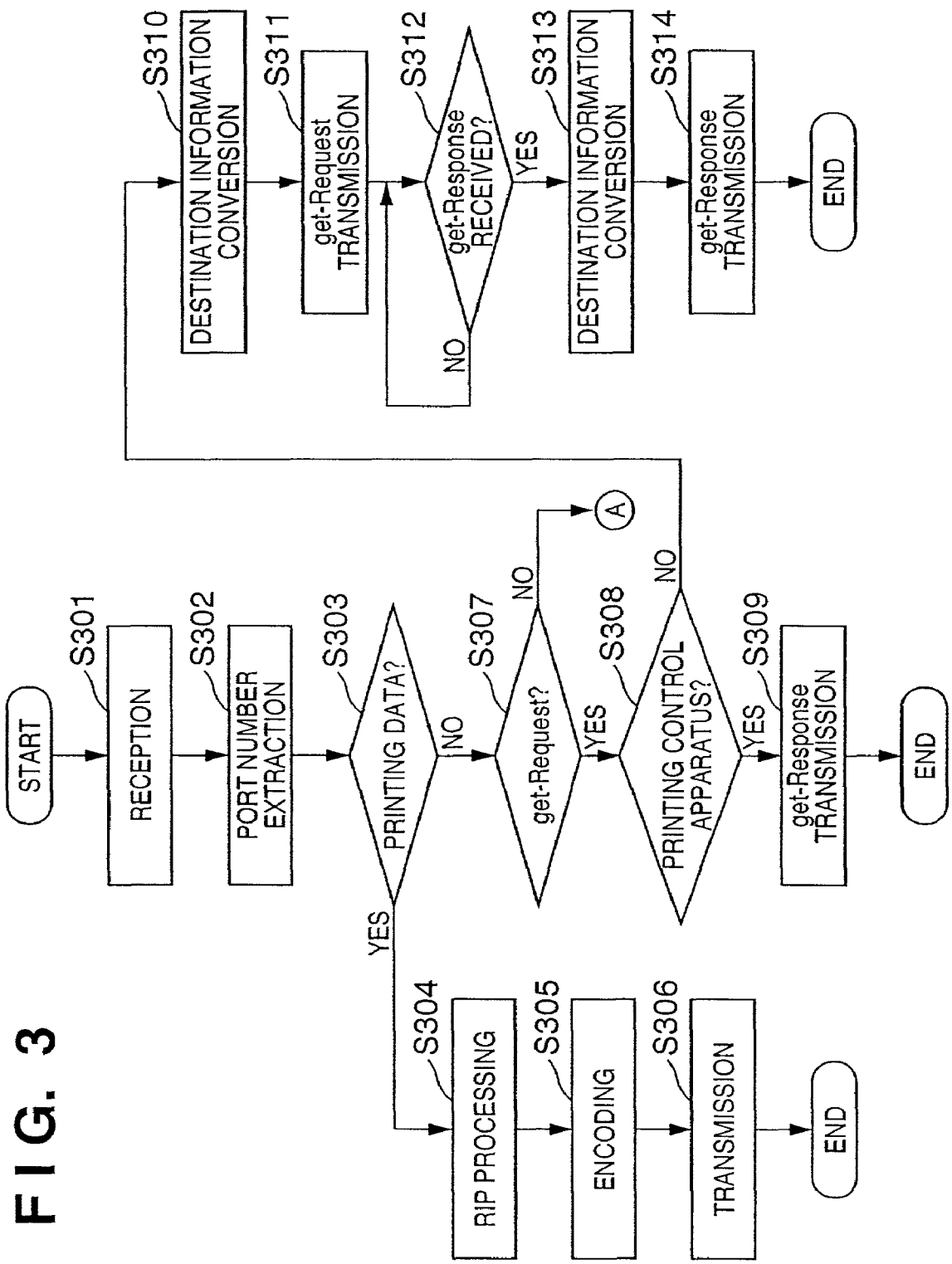
FIG. 3 is a flowchart explaining "get-Request" command processing in the printing control apparatus according to the embodiment of the present invention.
Figure 11:
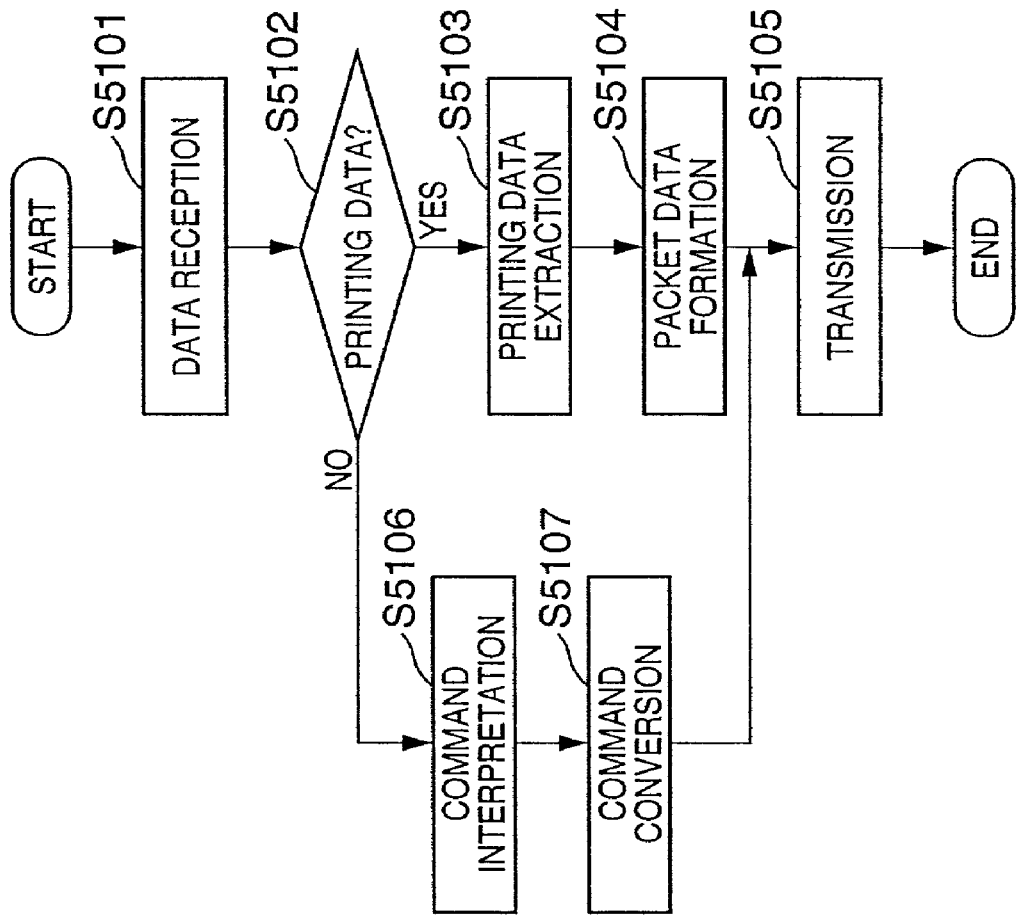
FIG. 11 is a flowchart explaining processing of a conventional printer server.
Figure 12:
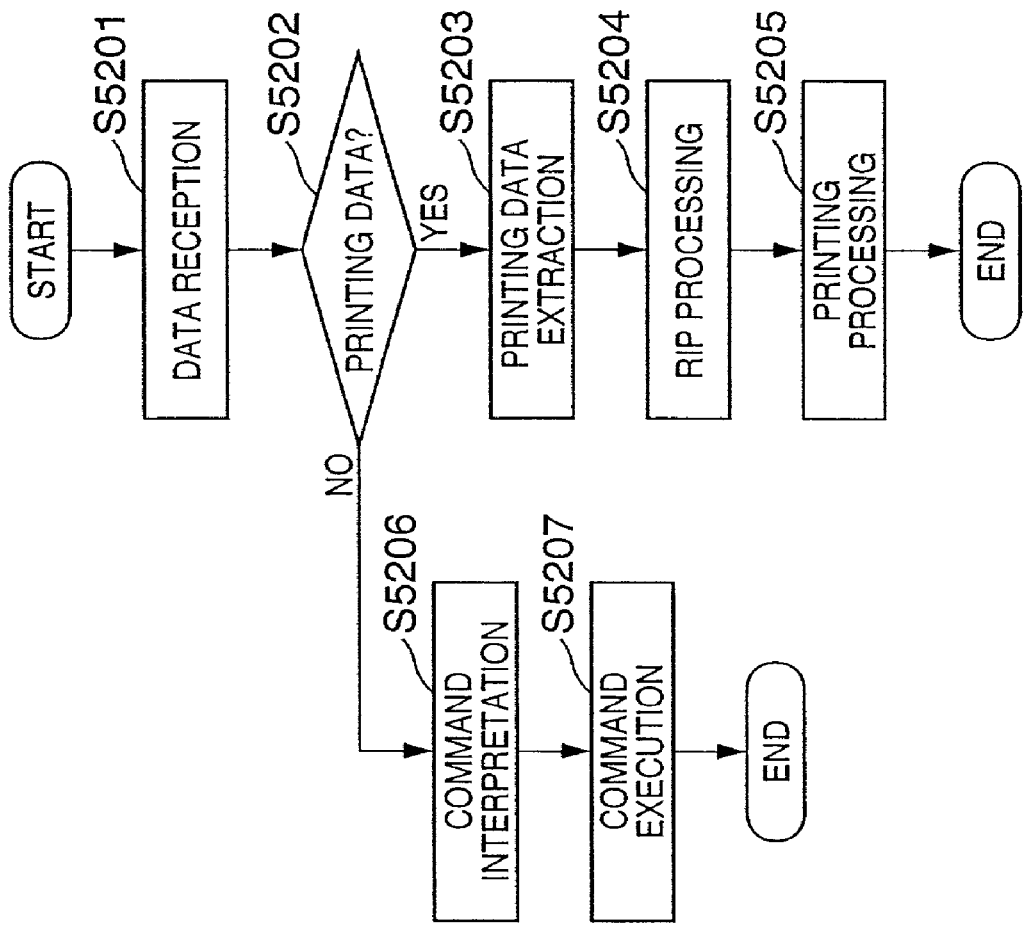
FIG. 12 is a flowchart explaining processing of a conventional image forming apparatus.

FIG. 2 is a view showing a connection form of a printing control apparatus according to the embodiment of the present invention. In FIG. 2, the components identical to those of FIG. 11, which have been described above as the conventional art, are referred to by the same reference numerals and detailed description thereof is omitted.

A printing control apparatus 201 according to the present embodiment comprises: a connector 202 for connecting the apparatus 201 to the LAN 5001 serving as a network; and a connector 203 for connecting the apparatus 201 to a LAN 204. As shown in FIG. 2, the printing control apparatus 201 according to the present embodiment is provided between the LAN 5001 and network interface 5008 of the image forming apparatus 5007, connected to the LAN 5001 through the connector 202 and connected to the LAN 204 through the connector 203. The LAN 204 is connected to the image forming apparatus 5007 through the network interface 5008 of the image forming apparatus 5007.

—Construction of Printing Control Apparatus

Figure 1:
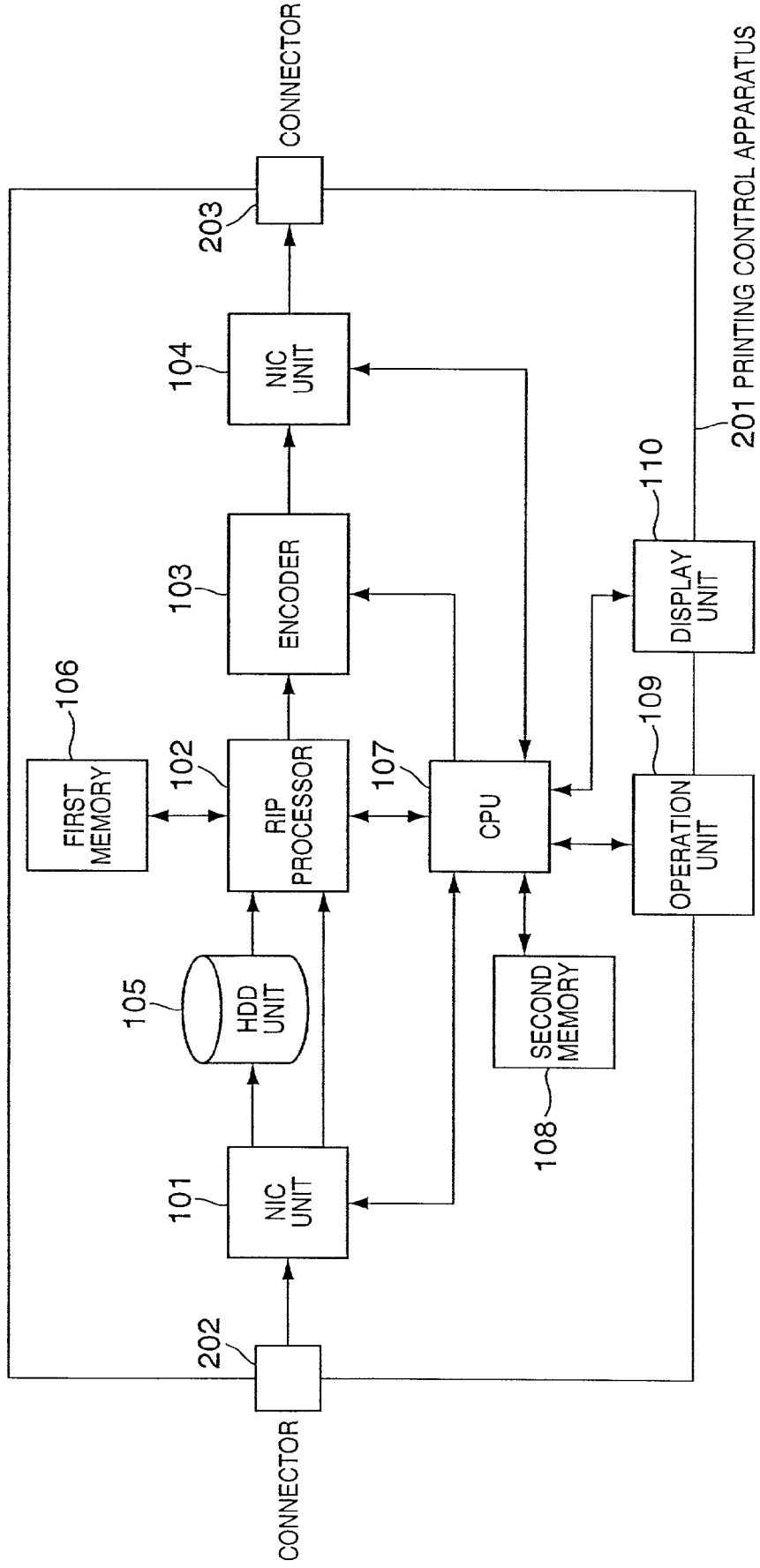
FIG. 1 is a block diagram showing an example of a construction of a printing control apparatus according to an embodiment of the present invention.

FIG. 1 is a block diagram showing an example of a brief construction of the printing control apparatus 201. Referring to FIG. 1, reference numerals 202 and 203 denote connectors. A network interface card (NIC) unit 101, serving as a first network interface, controls connection to the LAN 5001 in the lower-layer level. An RIP processor 102 converts a received printing language, such as a PDL, or a specified data format (data compressed by JBIG or the like) to raster image data. An encoder 103 converts the raster image data to a printing data format or data format supported by the image forming apparatus 5007. An NIC unit 104, serving as a second network interface, controls connection to the LAN 204 in the lower-layer level. A hard disk drive (HDD) unit 105 temporarily stores (spool) printing data received by the NIC unit 101. A first memory 106 is used by the RIP processor 102 for image developing processing. A CPU 107 controls the entire printing control apparatus. A second memory 108 is used by the CPU 107 as a temporary data storage area. An operation unit 109, including buttons, keys, a touch panel and so on, is provided for performing operation of the printing control apparatus. A display unit 110 gives information to an operator with images or characters.

—Operation

Next, operation of the printing control apparatus shown in FIG. 1 is described with reference to the flowcharts in FIGS. 3 to 6. Note that the following description is provided on an example in which printing data is transmitted from the terminal apparatus 5009 to the printing control apparatus 201. Also note that communication through the LAN 5001 is performed in compliance with the TCP/IP (Transmission Control Protocol/Internet Protocol), and the image forming apparatus 5007 has the SNMP (Simple Network Management Protocol) agent function. The following processing can be realized by having the CPU 107 execute a program, stored in one or more of the first memory 106, second memory 108, and HDD 105, to control each of the functional blocks.

The printing control apparatus 201 according to the present embodiment is characterized by having a function to act as an SNMP agent for an apparatus connected to the LAN 5001, and to act as an SNMP manager for an apparatus connected in lower-layer level, such as the image forming apparatus 5007, in addition to a data format conversion function.

Data packet, transmitted from the terminal apparatus 5009 to the printing control apparatus 201, is propagated to the LAN 5001 and captured by the printing control apparatus 201 through the connector 202. The NIC unit 101 of the printing control apparatus 201 performs reception processing of the data packet (step S301). Since the data packet, received by the NIC unit 101, complies with TCP/IP (or User Datagram Protocol (UDP)), a destination port number is included in the header information portion of the packet.

Figure 7:
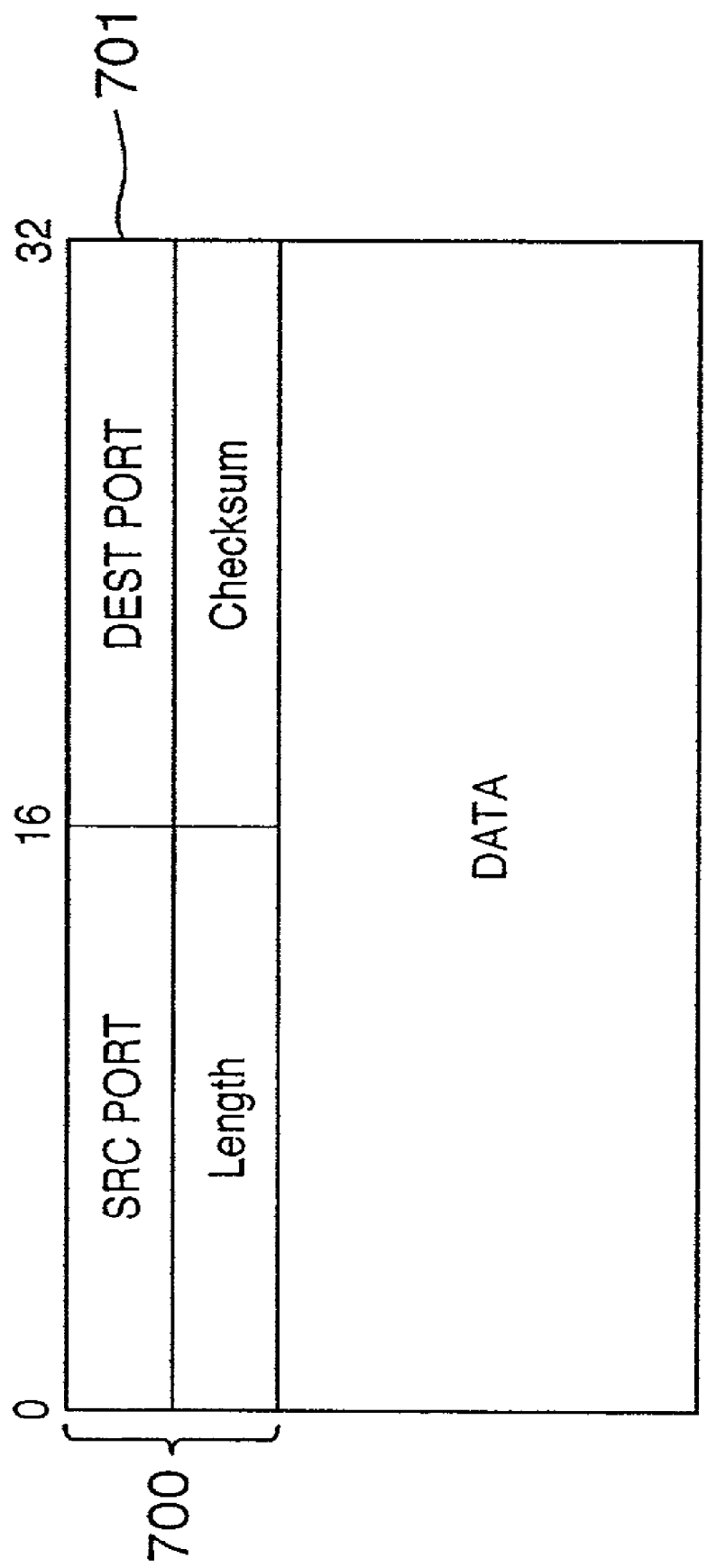
FIG. 7 is a structural view of UDP packet data.
Figure 8:
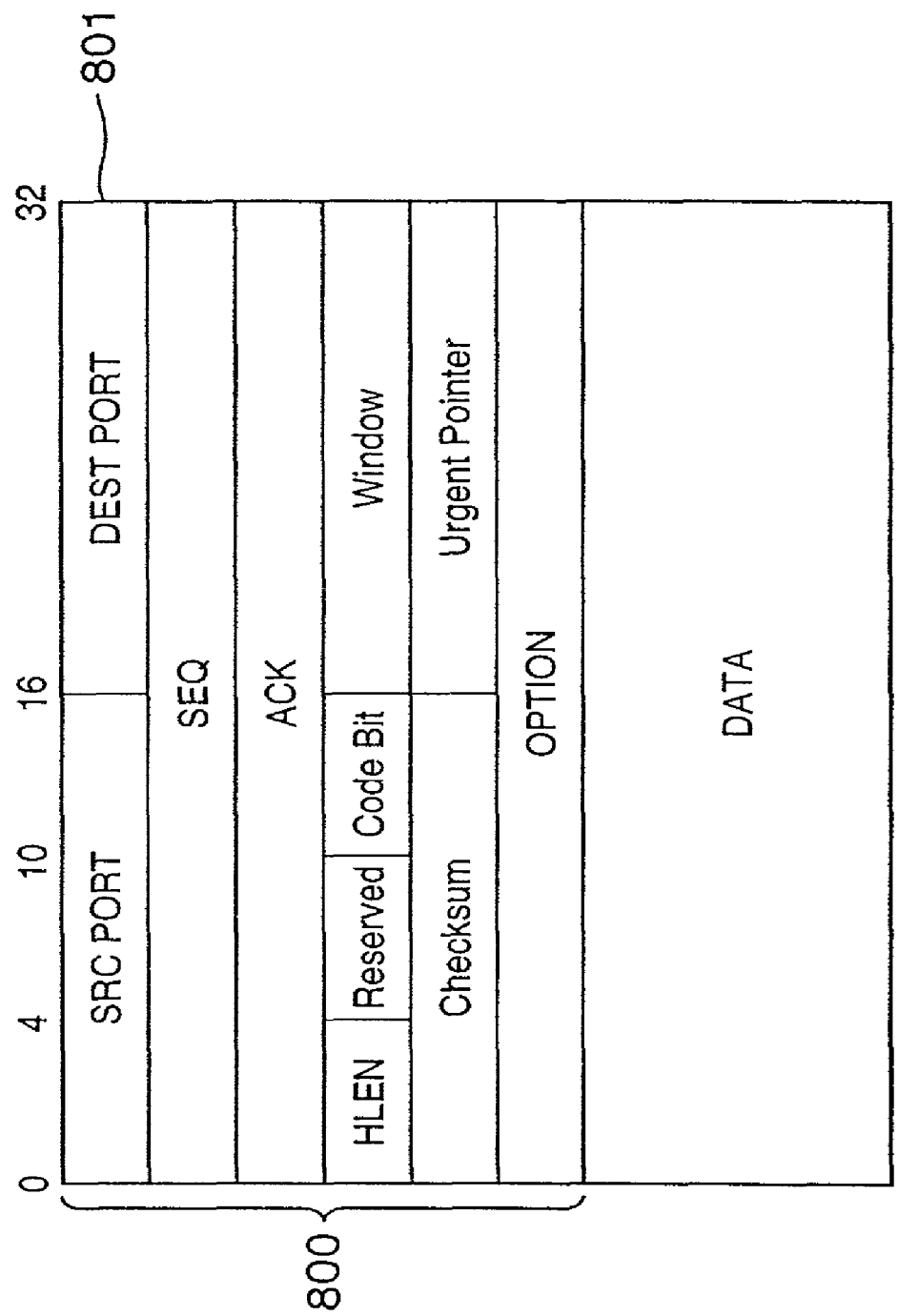
FIG. 8 is a structural view of TCP packet data.

FIG. 7 is a structural view of a UDP packet. The destination port number is included in the destination port number (DEST PORT) area 701 of the header portion 700. FIG. 8 is a structural view of a TCP packet. The destination port number is included in the destination port number (DEST PORT) area 801 of the header portion 800. Since the destination port number indicates to which program/process of the apparatus, receiving the packet, the data should be sent, different port numbers are allocated for each communication protocol or program (e.g., File Transfer Protocol (FTP)=Port21, Simple Mail Transfer Protocol (SMTP)=Port25, SNMP=Port161). Therefore, it is possible to determine whether the received packet is printing data or other data, such as control data, by extracting a port number included in the header of the received data packet and determining whether or not the port number corresponds to printing processing. The NIC unit 101, which also functions as the first determination means, extracts a destination port number from the header of the received data packet (step S302), and determines based on the destination port number whether the data packet is printing data or control data (step S303).

If it is determined that the data packet is printing data, the received data is written in the HDD 105 by controlling of the CPU 107 as necessary. This is called queuing (spooling) that is generally performed to improve data transfer speed. The data stored in the HDD 105 is read out of the RIP processor 102 according to instruction of the CPU 107. Meanwhile, printing data, which was not queued, is transferred directly to the RIP processor 102 according to instruction of the CPU 107.

The printing data, transferred to the RIP processor 102, is converted to raster image data by the RIP processor 102 (step S304). Then, the encoder 103, serving as the second determination means and data format conversion means, encodes the raster image data to a data format, which is interpretable by the image forming apparatus 5007, based on a predetermined data format interpretable by the image forming apparatus 5007 (or data format acquired by the image forming apparatus 5007 via communication or designated by the operation unit 109) and received data format (step S305).

The encoding processing (step S305) is performed when it is necessary. Therefore, if the received printing data format is interpretable by the image forming apparatus 5007 and encoding processing is not necessary, the encoding processing may be skipped. The format of the encoded data must be interpretable by an image forming apparatus. The format varies depending on the capability of interpretation means of the image forming apparatus 500, and may be, for instance, in a specified printing language or a data format compressed by a specified method such as JBIG or the like.

The data, encoded in accordance with the necessity, is again formed into a data packet by the NIC unit 104, which serves as the first output means to transmit data to the LAN 204. The data packet is outputted from the connector 203 (step S306) to the LAN 204, then to the image forming apparatus 5007 through the network interface 5008. The image forming apparatus 5007, which receives the data packet, performs printing on a printing medium, such as paper or the like, in accordance with printing process steps stored therein.

If it is determined in the determination step (step S303) that the data packet is not printing data, then it is determined whether or not the received data is a "get-Request" command which is an information request packet in the SNMP protocol (step S307). When the determination step (step S307) determines that the received data is a "get-Request" command, it is determined whether the requested information is related to the printing control apparatus 201 or image forming apparatus 5007 (step S308). This determination can be made based on, for instance, a Management Information Base (MIB) object identifier (OID) included in the command Protocol Data Unit (PDU). An apparatus holds information regarding the state of the apparatus in the database format. This database is called Management Information Base (MIB). The MIB holds data in a tree structure, and all nodes are uniquely numbered. An identifier of this node is called an object identifier (OID).

When the determinations step (step S308) determines that the requested information is related to the printing control apparatus 201, the CPU 107 serving as command execution means generates a "get-Response" command based on information held in the printing control apparatus 201, and outputs the "get-Response" command, which is an information response packet in the SNMP protocol, to the terminal apparatus 5009 which has originated the request (step S309).

Figure 9:
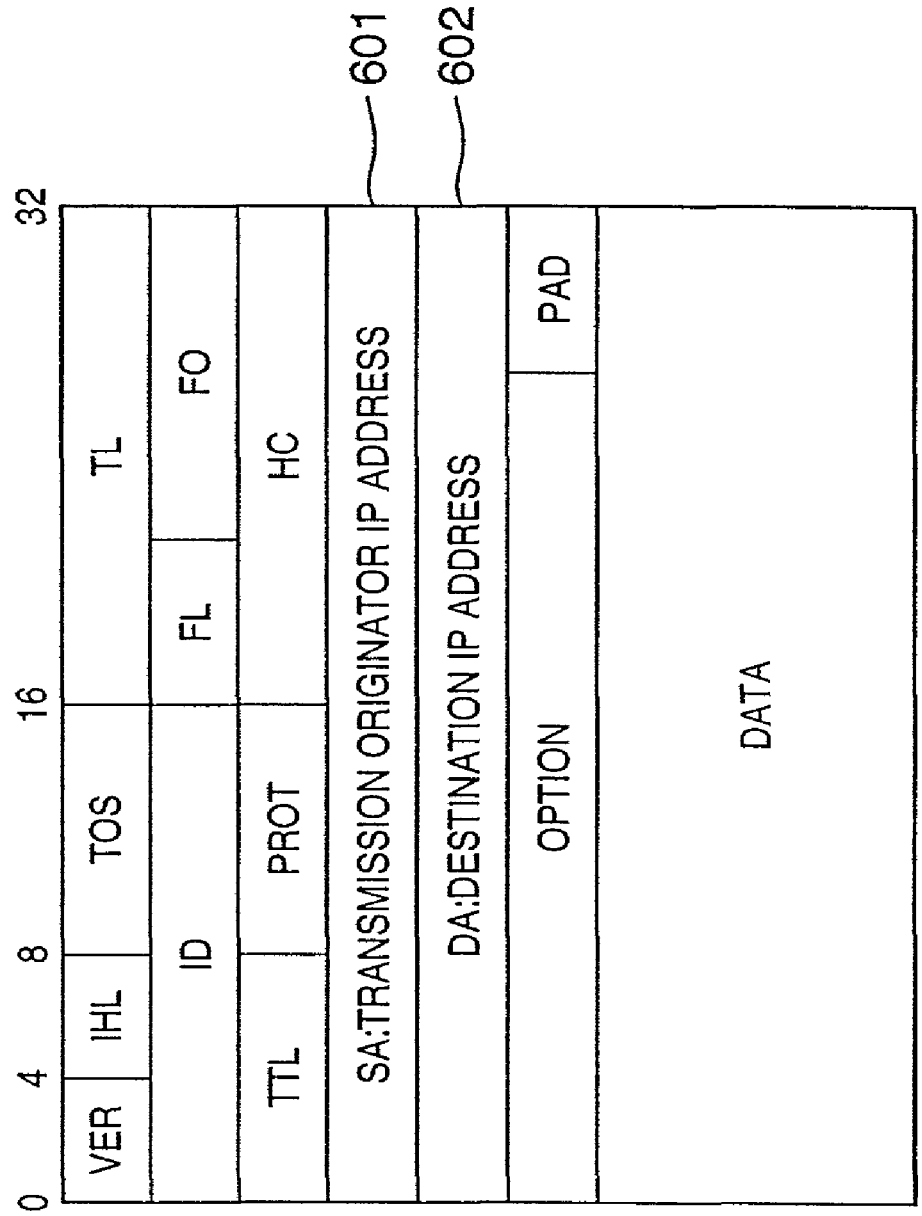
FIG. 9 is a structural view of IP packet data.
Figure 10:
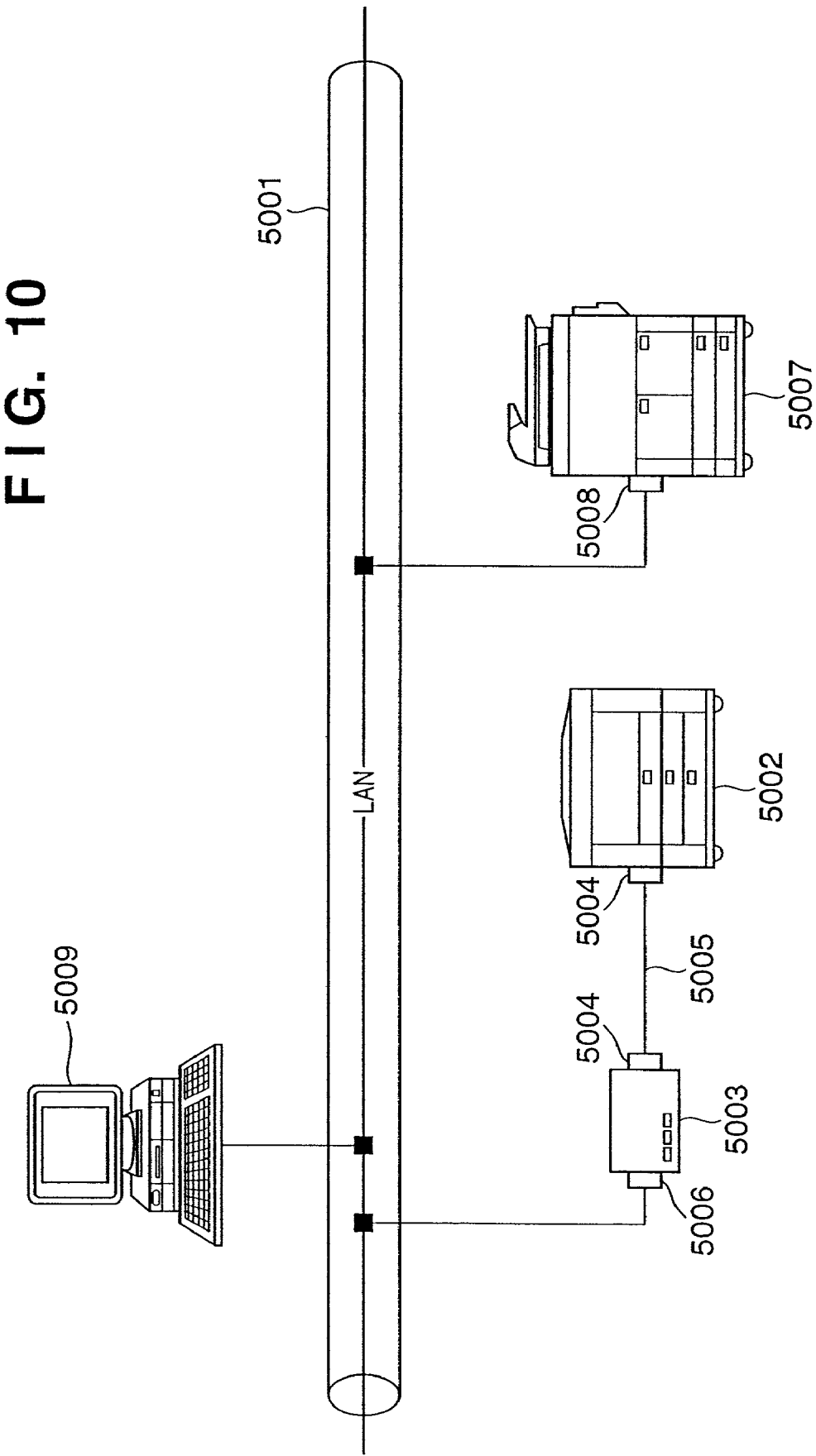
FIG. 10 is a view showing a connection form of a conventional image forming apparatus to a network.

Meanwhile, when the determinations step (step S308) determines that the requested information is related to the image forming apparatus 5007, the printing control apparatus 201 (CPU 107 serving as data conversion means) performs address conversion processing on the packet data in order to acquire information from the image forming apparatus 5007. More specifically, in a case where the SNMP adopts UDP/IP protocol, the transmission originator IP address 601 and destination IP address 602 in the IP packet header shown in FIG. 9 are rewritten. In other words, the transmission originator IP address is changed from an IP address of the terminal 5009 to an IP address of the printing control apparatus 201, and the destination IP address is changed from an IP address of the printing control apparatus 201 to an IP address of the image forming apparatus 5007. After address conversion processing is performed (step S310), a "get-Request" command is transmitted from the printing control apparatus 201 to the image forming apparatus 5007 (step S311).

Then, the printing control apparatus 201 standbys until it receives a "get-Response" command from the image forming apparatus 5007 (step S312). When the printing control apparatus 201 receives the command, in order to transfer the information back to the terminal apparatus 5009, the CPU 107 performs reverse conversion processing, rewriting the transmission originator IP address from the image forming apparatus 5007 to the printing control apparatus 201, and rewriting the destination IP address from the printing control apparatus 201 to the terminal 5009 (step S313). Then, the printing control apparatus 201 transmits a "get-Response" command, which is the information response packet in the SNMP protocol, to the terminal apparatus 5009 that has transmitted the "get-Request" command (step S314).

Figure 4:
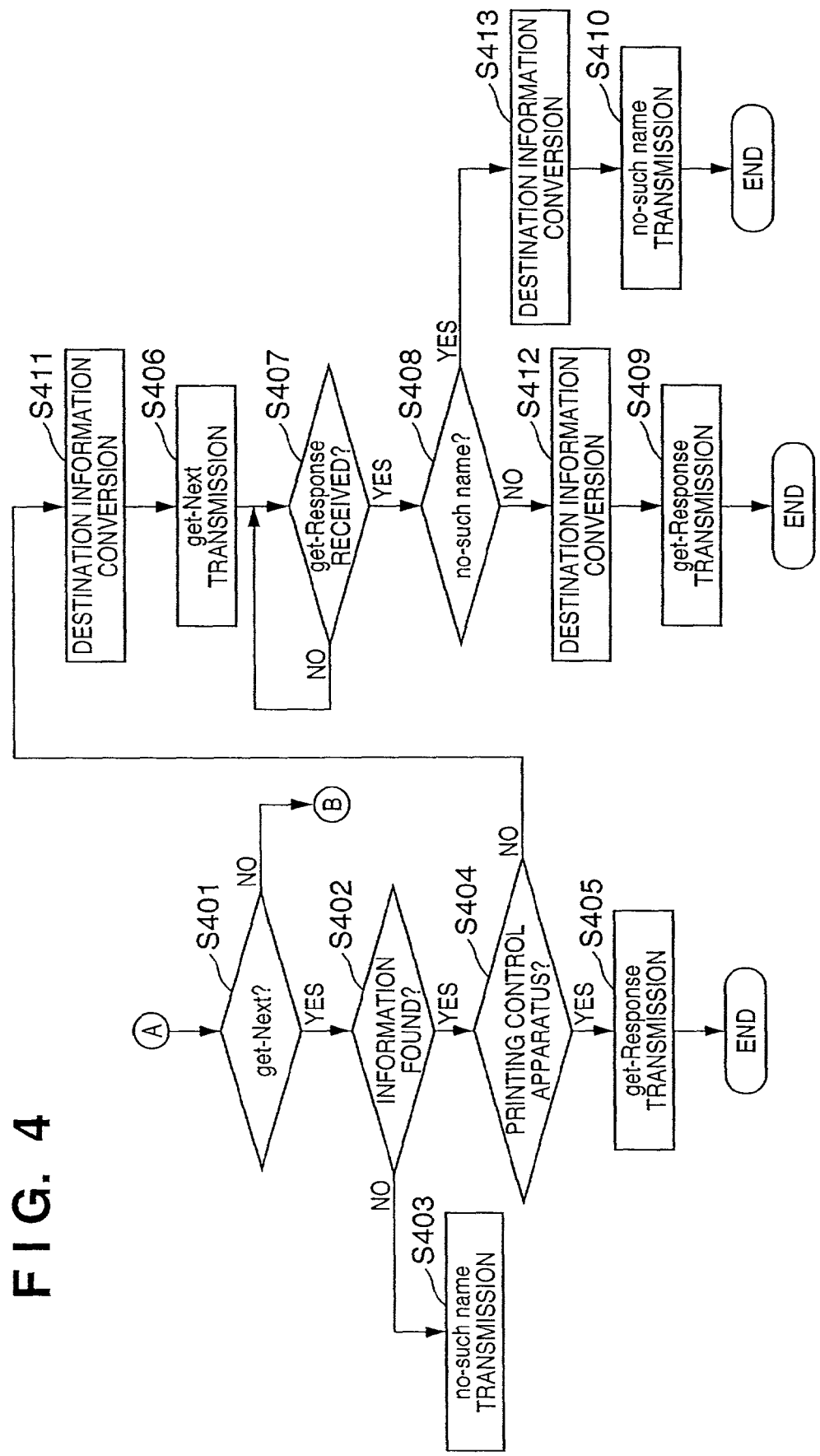
FIG. 4 is a flowchart explaining "get-Next" command processing in the printing control apparatus according to the embodiment of the present invention.

Next, a description is provided, with reference to the flow-chart in FIG. 4, on the case where the determination step (step S307) determines that the received data is not a "get-Request" command. First, it is determined that whether or not the received data is a "get-Next (GetNextRequest)" command which is an information request packet in the SNMP protocol (step S401). When the determination step (step S401) determines that the received data is a "get-Next" command, then it is determined that the requested information is within a responsible range of the printing control apparatus 201 or image forming apparatus 5007, as similar to the aforementioned "get-Request" command (step S402).

If the requested information is not within a responsible range, the printing control apparatus 201 transmits a "get-Response" command, including "no-such name" error information, to the terminal apparatus 5009 which has transmitted the "get-Next" command (step S403). The "no-such name" error information indicates that the information requested to the system (constructed with the printing control apparatus 201 and image forming apparatus 5007) is not found.

Meanwhile, if the determination step (step S402) determines that the requested information is within a responsible range of the printing control apparatus 201 or image forming apparatus 5007, then it is determined whether or not the requested information is related to the printing control apparatus 201 or image forming apparatus 5007 (step S404). When the determination step (step S404) determines that the requested information is related to the printing control apparatus 201, the printing control apparatus 201 transmits a "get-Response" command, which is an information response packet in the SNMP protocol, to the terminal apparatus 5009, which has transmitted the "get-Next" command, based on the information stored in the printing control apparatus 201 (step S405).

Meanwhile, when the determination step (step S404) determines that the requested information is related to the image forming apparatus 5007, in order to acquire information from the image forming apparatus 5007, the CPU 107 of the printing control apparatus 201 changes the destination information in the similar manner to the "get-Request" command processing (step S411). Then, the printing control apparatus 201 transmits a "get-Next" command to the image forming apparatus 5007 (step S406).

Then, the printing control apparatus 201 standbys until it receives a "get-Response" command from the image forming apparatus 5007 (step S407). When the printing control apparatus 201 receives the command, it confirms whether or not the received command includes "no-such name" error information (step S408). If the confirmation step (step S408) confirms that the image forming apparatus 5007 has returned a normal "get-Response" command which does not include "no-such name" error information, in order to transmit this information to the terminal apparatus 5009, the CPU 107 changes the destination information in the similar manner to the "get-Request" command processing (step S412). Then, the printing control apparatus 201 transmits a "get-Response" command to the terminal apparatus 5009 which has transmitted the "get-Next command (step S409).

Meanwhile, if the confirmation step (step S408) confirms that the image forming apparatus 5007 has returned a "get-Response" command which includes "no-such name" error information, in order to transmit this information to the terminal apparatus 5009, the command is transmitted to the communication processor 105 for changing the destination information (step S413). Then, the printing control apparatus 201 transmits a "get-Response" command which includes "no-such name" error information, indicating that the system does not have requested information, to the terminal apparatus 5009 which has transmitted the "get-Next" command (step S410).

Figure 5:
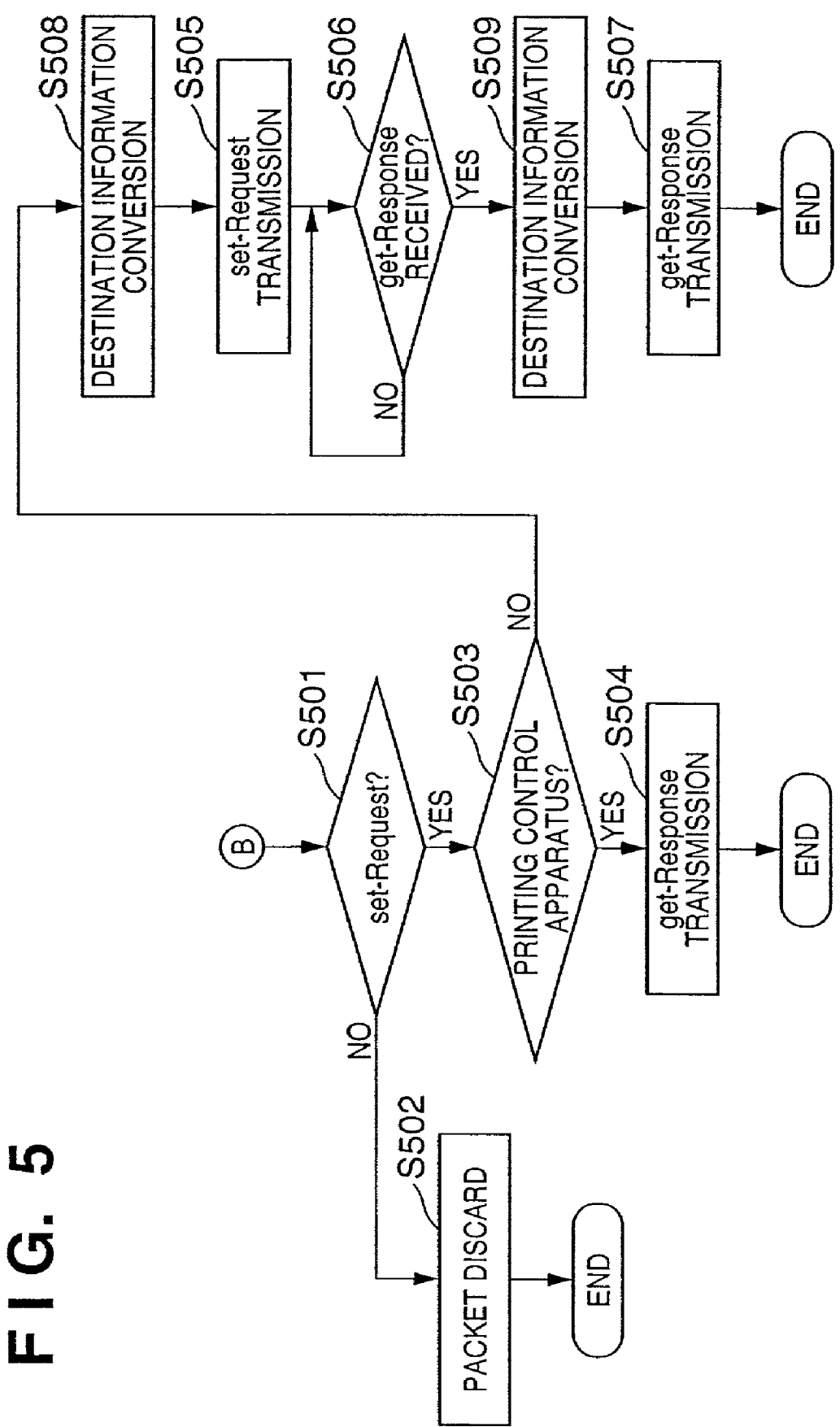
FIG. 5 is a flowchart explaining "set-Request" command processing in the printing control apparatus according to the embodiment of the present invention.

Next, a description is provided, with reference to the flowchart in FIG. 5, on the case where the determination step (step S401) determines that the received data is not a "get-Next" command. First, it is determined whether or not the received data is a "set-Request" command which is an information setting packet in the SNMP protocol (step S501). If the determination step (step S501) determines that the received data is a "set-Request" command, then it is determined whether the requested setting information is directed to the printing control apparatus 201 or image forming apparatus 5007 (step S503).

When the determination step (step S503) determines that the requested setting information is directed to the printing control apparatus 201, the printing control apparatus 201 rewrites the information stored therein. Then, the printing control apparatus 201 transmits a "get-Response" command, which is an information response packet in the SNMP protocol, to the terminal apparatus 5009 which has transmitted the "set-Request" command (step S504) to notify that the setting has normally been completed.

Meanwhile, when the determination step (step S503) determines that the requested setting information is directed to the image forming apparatus 5007, the CPU 107 performs address conversion processing (step S508) in order to set the information to the image forming apparatus 5007. Then, the "set-Request" command is transmitted from the printing control apparatus 201 to the image forming apparatus 5007 (step S505). The printing control apparatus 201 standbys until it receives a "get-Response" command from the image forming apparatus 5007 (step S506). When the printing control apparatus 201 receives the command, the CPU 107 performs address conversion in order to transfer the information back to the terminal apparatus 5009 (step S509). Then, the printing control apparatus 201 transmits a "get-Response" command, which is the information response packet in the SNMP protocol, to the terminal apparatus 5009 that has transmitted the "set-Request" command (step S507).

If the determination step (step S501) determines that the received data is not a "set-Request" command, the command is determined as a non-supported command of the apparatus. The packet is discarded (step S502) and the communication processing ends.

Figure 6:
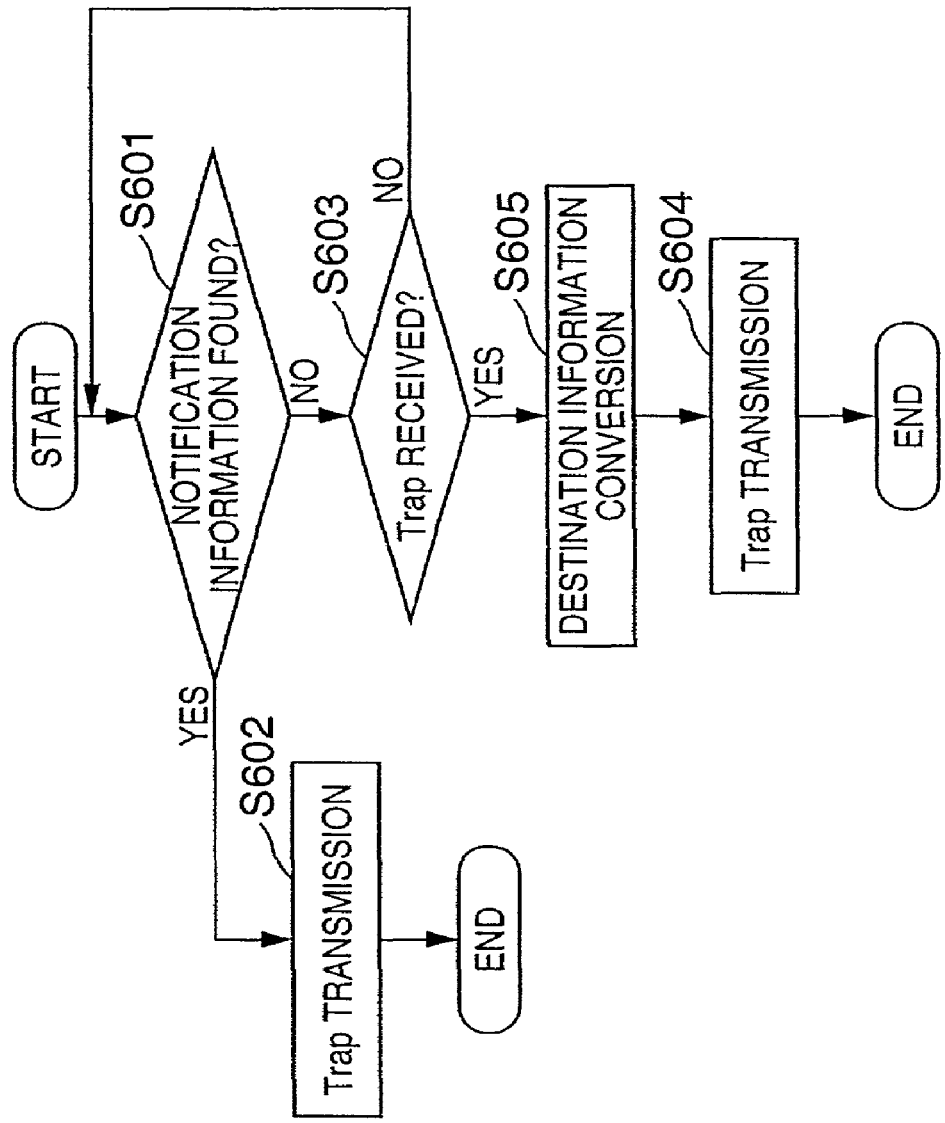
FIG. 6 is a flowchart explaining "Trap" command processing in the printing control apparatus according to the embodiment of the present invention.

Referring to FIG. 6, a description is provided on processing of a "Trap" command which is an information notification packet in the SNMP protocol. This processing is performed independently of the above-described processing shown in FIGS. 3 to 5. This processing is executed in predetermined cycles, or executed as resident processing. First, the printing control apparatus 201 determines (step S601) whether or not there is an event occurred within the apparatus, which needs to be notified to a predetermined control apparatus connected to the LAN 5001 (terminal apparatus 5009 in this case). The event includes, for instance, detection of a break in a cable, an off-line state set by the operation panel, and so on.

When there is an event occurred in the printing control apparatus 201, which needs to be notified to the terminal apparatus 5009, the printing control apparatus 201 generates a "Trap" packet, directed to the terminal apparatus 5009, to notify the occurrence of the event, and transmits the packet to the LAN 5001 (step S602).

When the determination step (step S601) determines that there is no event occurred in the printing control apparatus 201, then it is determined whether or not a "Trap" packet is transmitted from the image forming apparatus 5007 (step S603). The image forming apparatus transmits a "Trap" packet when the apparatus experiences an event, such as exhaustion of paper serving as a printing medium, or paper jam, or the like.

If reception of a "Trap" packet from the image forming apparatus 5007 is not detected at step S601, the control returns to the beginning of the processing to repeat the processing of monitoring an occurrence of an event. If a "Trap" packet, whose destination IP address designates the printing control apparatus, is transmitted from the image forming apparatus 5007, the transmission originator IP address and destination IP address in the IP header of the packet are converted as described above (step S605), and the printing control apparatus 201 transmits the "Trap" packet to the terminal apparatus 5009 (step S604). Accordingly, the terminal apparatus 5009 can acknowledge an event occurred in the printing control apparatus 201 or image forming apparatus 5007.

In the above-described embodiment, descriptions have been given on a case where the printing control apparatus adopts the SNMP protocol to perform data collection of the printing control apparatus or the image forming apparatus serving as a lower-layer level apparatus, and to perform response or notification to an upper-layer level apparatus. However, an arbitrary method that realizes the similar processing can be employed. For instance, the printing control apparatus may serve as an SNMP agent for an upper-layer level apparatus, or may serve as a host complying another network protocol for a lower-layer level apparatus, or may employ other network protocols for communication with an upper-layer level apparatus.

Further note that information that helps determining whether or not data is within a responsible range of the lower-layer level image forming apparatus can also be stored in a format other than the MIB.

Furthermore, although the above-described embodiment converts the address portion of the IP packet header in the address conversion processing, a necessary transmission originator address and destination address are converted in accordance with a communication protocol.

Moreover, although the foregoing descriptions have been given on a case where the "Trap" from the image forming apparatus is notified to the printing control apparatus, the image forming apparatus may arbitrarily set the destination when generating a "Trap" packet, and may be set to, for instance, the terminal apparatus 5009. In this case, the address conversion processing at step S605 is not necessary. Thus, the "Trap" packet is simply outputted to the LAN 5001.

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium, storing program codes of a software realizing the above-described functions of the embodiment, to a computer system or apparatus, reading the program codes, by a CPU or MPU of the computer system or apparatus, from the storage medium, then executing the program.

In this case, the program codes read from the storage medium realize the functions according to the embodiment, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiment are realized by executing the program codes which are read by a computer, the present invention includes a case where an OS (operating system) or the like working on the computer performs a part or the entire processes in accordance with designations of the program codes and realizes functions according to the above embodiment.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or the entire process in accordance with designations of the program codes and realizes functions of the above embodiment.

In a case where the present invention is applied to the aforesaid storage medium, the storage medium stores program codes corresponding to the flowcharts (at least one of the flowcharts shown in FIGS. 3 to 6) described in the embodiment.

As has been described above, by virtue of utilizing the printing control apparatus of the present invention, an image forming apparatus having network connection means, such as a network interface, is enabled to print printing data, written in a printing language or data format that cannot be interpreted by the image forming apparatus alone, and in addition, upon performing address conversion of a data packet, acquire information of an image forming apparatus which is not directly connected to the network but connected via the printing control apparatus.

Furthermore, the present invention can be applied to the system comprising either a plurality of units or a single unit. It is needless to say that the present invention can be applied to the case which can be attained by supplying programs which execute the process defined by the present system or invention.

As many apparently widely different embodiments of the present invention can be made without departing from the spirit and scope thereof, it is to be understood that the invention is not limited to the specific embodiments thereof except as defined in the claims.

What is claimed is:

1. A printing control apparatus having a first network interface and a second network interface, the first network interface connecting to a network and the second network interface directly connecting through a local area network to a network interface of an image forming apparatus that interprets printing data, the printing control apparatus comprising:
   a first receiving unit, arranged to receive each of at least one packet including the printing data to be printed and at least one packet including request data for requesting information related to the image forming apparatus, through the first network interface from a transmission originator, a destination address of the received packet including the request data being an address of the printing control apparatus;
   a format conversion unit, arranged to convert a format of the received printing data to a different format interpretable by the image forming apparatus.

2. The printing control apparatus according to claim 1, wherein said first generation unit sets an address of the printing control apparatus as a transmission originator address of the packet including the request data.

3. The printing control apparatus according to claim 2, wherein said first generation unit sets the address of the image forming apparatus as the destination address of the packet including the request data.

4. The printing control apparatus according to claim 1, wherein the request data is a command of SNMP protocol.

5. The printing control apparatus according to claim 1, wherein the information related to the image forming apparatus is included together with a command of SNMP protocol.

6. The printing control apparatus according to claim 1, further comprising a first determination unit, arranged to determine based on a destination port number of the received packet whether said first receiving unit receives the packet including the printing data or the packet including the request data.

7. The printing control apparatus according to claim 1, further comprising a first determination unit, employed in a case where said first receiving unit receives the packet including the printing data, to determine whether or not to convert the format of the printing data.

8. The printing control apparatus according to claim 7, wherein said first determination unit determines whether or not to convert the format of the received printing data based on a determination of whether or not the format of the received printing data is a predetermined format which is interpretable by the image forming apparatus.

9. The printing control apparatus according to claim 1, wherein
said first receiving unit receives at least one packet including request data for requesting information related to the printing control apparatus, and
the printing control apparatus further comprises a third determination unit, employed in a case where said first receiving unit receives the packet including the request data, to determine whether the request data requests the information related to the printing control apparatus or the information related to the image forming apparatus by analyzing the request data.

10. A control method of a printing control apparatus having first and second network interfaces, the first network interface connecting to a network and the second network interface directly connecting through a local area network to a network interface of an image forming apparatus that interprets printing data, the method comprising:
a first receiving step of receiving at least one packet including the printing data to be printed, through the first network interface;
a second receiving step of receiving at least one packet including request data for requesting information related to an image forming apparatus, through the first network interface from a transmission originator, a destination address of the received packet including the request data being an address of the printing control apparatus;
a format conversion step of converting a format of the received printing data to a different format interpretable by the image forming apparatus;
a first output step of outputting at least one packet including the printing data whose format has been converted, through the second network interface and the local area network;
a first generation step of generating at least one packet including the request data that is included in the packet received in said second receiving step, wherein an address of the image forming apparatus is set, instead of the address of the printing control apparatus, as a destination address of the generated packet in said first generation step, the address of the image forming apparatus being different from the address of the printing control apparatus;
a second output step of outputting the packet including the request data, generated in said first generation step through the second network interface and the local area network;
a third receiving step of receiving at least one packet including the information related to the image forming apparatus that is a response by the image forming apparatus to the request data included in the packet output by the second output unit in said second output step, through the second network interface and the local area network, a destination address of the received packet including the information related to the image forming apparatus being an address of the printing control apparatus;
a second generation step of generating at least one packet including the information related to the image forming apparatus, wherein an address of the transmission originator of the received packet including the request data is set, instead of the address of the printing control apparatus, as a destination address of the generated packet in said second generation step; and
a third output step of outputting the packet generated in said second generation step through the first network interface.

11. The control method of a printing control apparatus according to claim 10, further comprising:
a fourth receiving step of receiving at least one packet including request data for requesting information related to the printing control apparatus, through the first network interface;
a first determination step of determining whether the received packet includes the printing data or the request data; and
a second determination step of determining whether the request data which is included in the received packet requests the information related to the image forming apparatus or the information related to the printing control apparatus, wherein,
in a case where the received packet includes the request data is for requesting the information related to the image forming apparatus, the generated packet including the request data is output to the image forming apparatus at said second output step.

12. The control method of a printing control apparatus according to claim 11, further comprising a fourth output step of, in a case where the received packet includes the request data for the printing control apparatus, outputting at least one packet including the information related to the printing control apparatus through the first network interface.

13. The control method of a printing control apparatus according to claim 10, wherein said first generation step comprises an address setting step of setting an address of the printing control apparatus as a transmission originator address of the packet including the request data.

14. The control method of a printing control apparatus according to claim 10, wherein the request data is a command of SNMP protocol.

15. The control method of a printing control apparatus according to claim 10, wherein the information related to the image forming apparatus is included together with a command of SNMP protocol.

16. The control method of a printing control apparatus according to claim 10, wherein the predetermined format is interpretable by the image forming apparatus.

17. The control method of a printing control apparatus according to claim 10, further comprising a first determination step of determining whether or not the packet received through the first network interface includes the printing data.

18. A printing control apparatus having a first network interface and a second network interface, the first network interface connecting to a network and the second network interface directly connecting through a local area network to a network interface of an image forming apparatus that interprets printing data, the printing control apparatus comprising:
a first receiving unit, arranged to receive each of at least one packet including the printing data to be printed and at least one packet including setting data for setting information related to the image forming apparatus, through the first network interface from a transmission originator, a destination address of the received packet including the setting data being an address of the printing control apparatus;
a format conversion unit, arranged to convert a format of the printing data to a different format interpretable by the image forming apparatus;
a first output unit, arranged to output at least one packet including the printing data whose format has been converted, through the second network interface and the local area network;
a first generation unit, arranged to generate at least one packet including the setting data that is included in the packet received by said first receiving unit, wherein the first generation unit sets an address of the image forming apparatus instead of the address of the printing control apparatus as a destination address of the generated packet, the address of the image forming apparatus being different from the address of the printing control apparatus;

a second output unit, arranged to output the packet including the request data, generated by said first generation unit through the second network interface and the local area network;

a second receiving unit, arranged to receive at least one packet including response data that is a response by the image forming apparatus to the setting data included in the packet output by the second output unit, through the second network interface and the local area network, a destination address of the received packet including the response data being an address of the printing control apparatus;

a second generation unit, arranged to generate at least one packet including the response data, wherein the second generation unit sets an address of the transmission originator of the received packet including the setting data instead of the address of the printing control apparatus as a destination address of the generated packet; and a third output unit, arranged to output the packet generated by said second generation unit through the first network interface.

* * * * *

UNITED STATES PATENT AND TRADEMARK OFFICE
CERTIFICATE OF CORRECTION

PATENT NO.       : 7,742,183 B2
APPLICATION NO.  : 10/118939
DATED            : June 22, 2010
INVENTOR(S)      : Eiichi Sato It is certified that error appears in the above-identified patent and that said Letters Patent is hereby corrected as shown below:

COLUMN 12:

Line 37, delete the "." after "apparatus", and insert therefor:

--;
a first output unit, arranged to output at least one packet including the printing data whose format has been converted, through the second network interface and the local area network;
a first generation unit, arranged to generate at least one packet including the request data that is included in the packet received by said first receiving unit, wherein the first generation unit sets an address of the image forming apparatus instead of the address of the printing control apparatus as a destination address of the generated packet, the address of the image forming apparatus being different from the address of the printing control apparatus;
a second output unit, arranged to output the packet including the request data, generated by said first generation unit through the second network interface and the local area network;
a second receiving unit, arranged to receive at least one packet including the information related to the image forming apparatus that is a response by the image forming apparatus to the request data included in the packet output by the second output unit, through the second network interface and the local area network, a destination address of the received packet including the information related to the image forming apparatus being an address of the printing control apparatus;
a second generation unit, arranged to generate at least one packet including the information related to the image forming apparatus, wherein the second generation unit sets an address of the transmission originator of the received packet including the request data instead of the address of the printing control apparatus as a destination address of the generated packet; and
a third output unit, arranged to output the packet generated by said second generation unit through the first network interface.--.

Signed and Sealed this

Sixteenth Day of November, 2010

David J. Kappos
*Director of the United States Patent and Trademark Office*